(12) United States Patent
Tomura et al.

(10) Patent No.: US 7,385,899 B2
(45) Date of Patent: Jun. 10, 2008

(54) RECORDING AND REPRODUCING METHOD FOR DYE BASED RECORDABLE OPTICAL RECORDING MEDIUM AND APPARATUS USING THE SAME

(75) Inventors: Tatsuya Tomura, Tokyo (JP); Tsutomu Sato, Yokohama (JP); Yasunobu Ueno, Yokohama (JP); Soh Noguchi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 92 days.

(21) Appl. No.: 11/362,194

(22) Filed: Feb. 27, 2006

(65) Prior Publication Data
US 2006/0164946 A1    Jul. 27, 2006

Related U.S. Application Data

(63) Continuation of application No. PCT/JP2004/011984, filed on Aug. 20, 2004.

(30) Foreign Application Priority Data

Aug. 26, 2003 (JP) .............................. 2003-301467
Jan. 29, 2004 (JP) .............................. 2004-022112

(51) Int. Cl.
*G11B 7/00* (2006.01)
(52) U.S. Cl. ................................ 369/59.11; 369/59.12
(58) Field of Classification Search ............. 369/59.11, 369/59.12, 116
See application file for complete search history.

(56) References Cited

U.S. PATENT DOCUMENTS 5,457,666 A * 10/1995 Toda et al. ............... 369/13.24
5,642,343 A * 6/1997 Toda et al. ............... 369/47.53
5,715,228 A * 2/1998 Takiguchi .................... 369/116
5,825,742 A * 10/1998 Tanaka et al. ........... 369/59.11
6,104,685 A * 8/2000 Saga et al. ............... 369/59.11
6,345,026 B1 * 2/2002 Furukawa et al. ........ 369/59.11
6,426,929 B1   7/2002 Watabe et al.
6,442,118 B1 * 8/2002 Hoshino et al. ........... 369/47.3
6,504,806 B1 * 1/2003 Nakajo ..................... 369/59.12
6,631,109 B2 * 10/2003 Nakamura ............... 369/59.11
6,704,269 B1   3/2004 Ogawa (Continued)

FOREIGN PATENT DOCUMENTS

EP    1 174 862 A2    1/2002

(Continued)

*Primary Examiner*—Thang V. Tran
(74) *Attorney, Agent, or Firm*—Dickstein Shapiro LLP

(57) ABSTRACT

The object of the present invention is to provide an optical recording and reproducing method for a dye-based recordable optical recording medium includes recording shortest marks on an organic dye recording layer formed on a substrate having a guide groove with a wobble formed thereon using one pulse which is more highly energized than pulses of each of marks other than the shortest marks; recording each of the third shortest marks and still longer marks using one pulse beam of which the rear edge is energized for a given length of time, and the energized pulse power is equal to the pulse power of each of the second shortest marks, and irradiating cooling pulses onto the backwards of the respective pulse beams of all the marks during recording at an optical energy of 0.1 mW or less for a given length of time, and provide an apparatus for the same.

17 Claims, 12 Drawing Sheets

U.S. PATENT DOCUMENTS

| | | | |
|---|---|---|---|
| 6,958,958 B2 * | 10/2005 | Iimura | 369/47.22 |
| 7,079,468 B2 * | 7/2006 | Worthington et al. | 369/94 |
| 7,193,961 B2 * | 3/2007 | Suenaga et al. | 369/275.4 |
| 2002/0110067 A1 | 8/2002 | Kondo et al. | |
| 2003/0067857 A1 | 4/2003 | Shirota et al. | |

FOREIGN PATENT DOCUMENTS

| | | |
|---|---|---|
| JP | 2000-011382 A | 1/2000 |
| JP | 2000-163850 | 6/2000 |
| JP | 2001-176073 A | 6/2001 |
| JP | 2001-331937 | 11/2001 |
| JP | 2002-222562 | 8/2002 |
| JP | 2002-358642 | 12/2002 |
| JP | 2003-16651 | 1/2003 |
| JP | 2003-85753 A | 3/2003 |
| JP | 2005-92950 | 4/2005 |

* cited by examiner

FIG. 1A - PRIOR ART
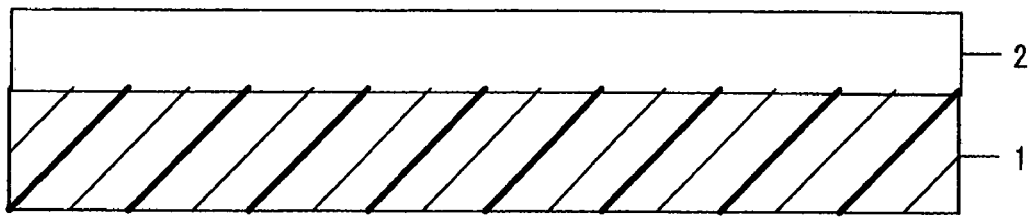
FIG. 1B - PRIOR ART
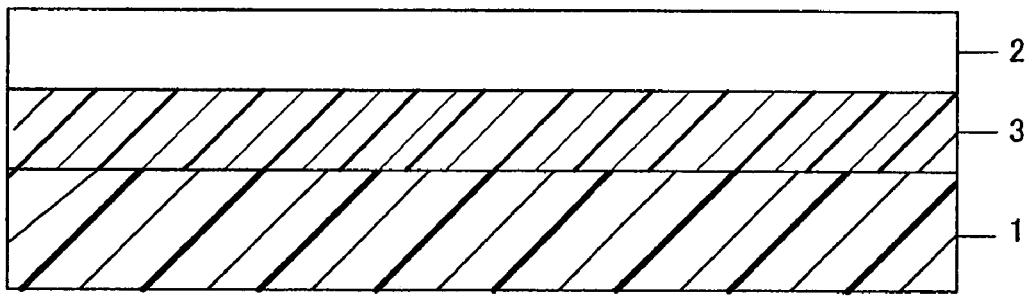
FIG. 1C - PRIOR ART
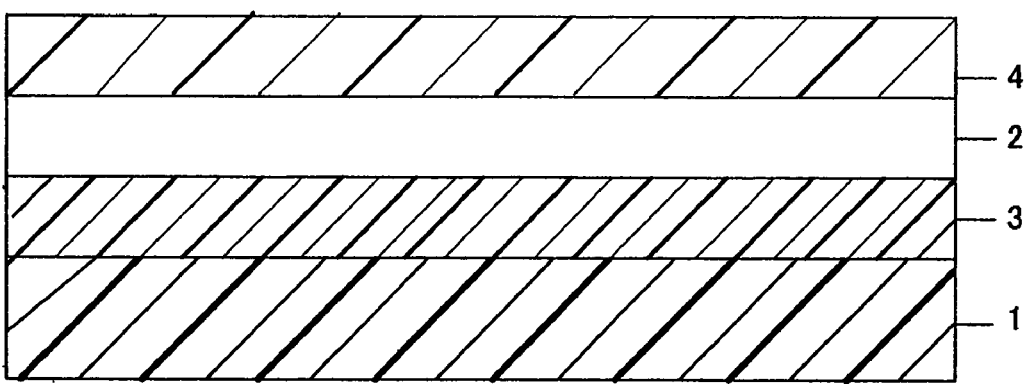

FIG. 1D - PRIOR ART
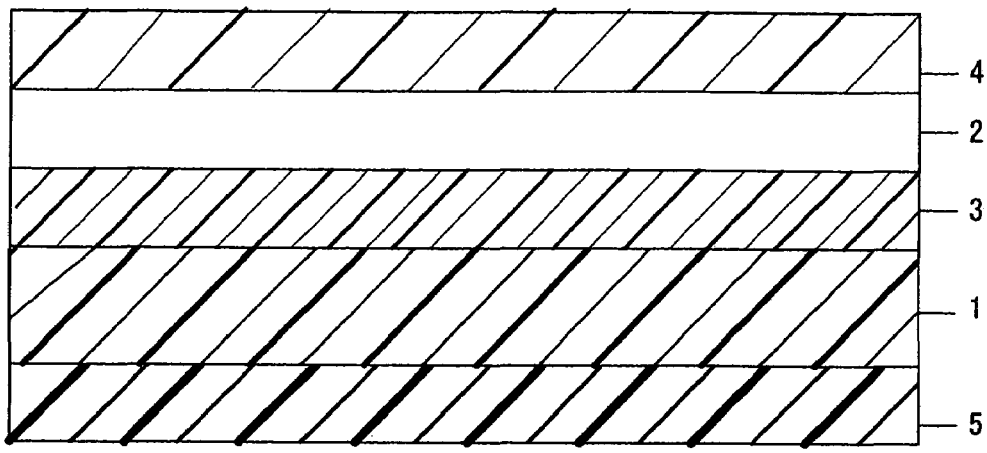
FIG. 2A - PRIOR ART
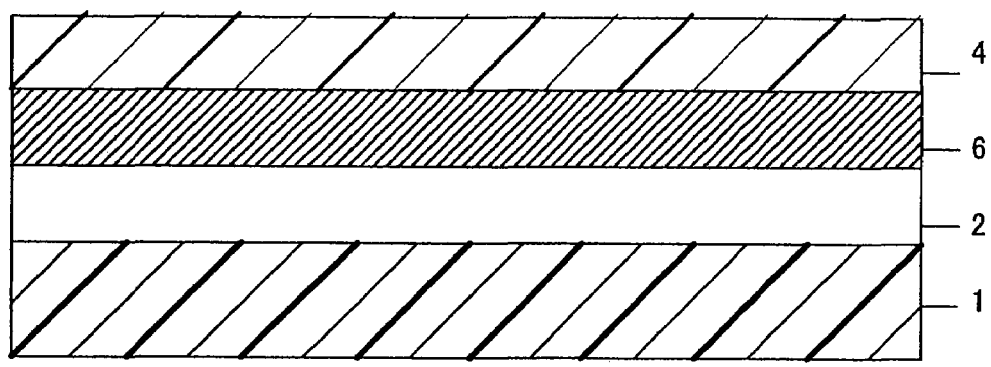
FIG. 2B - PRIOR ART
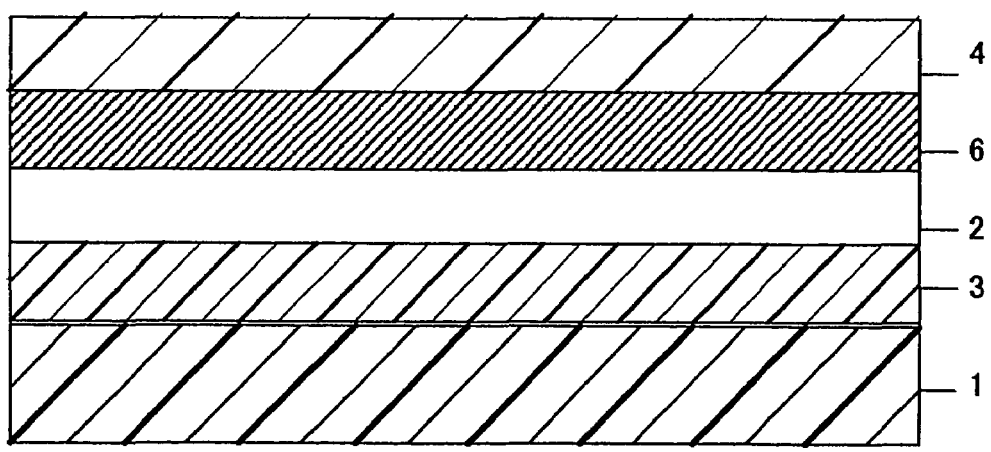

FIG. 2C - PRIOR ART
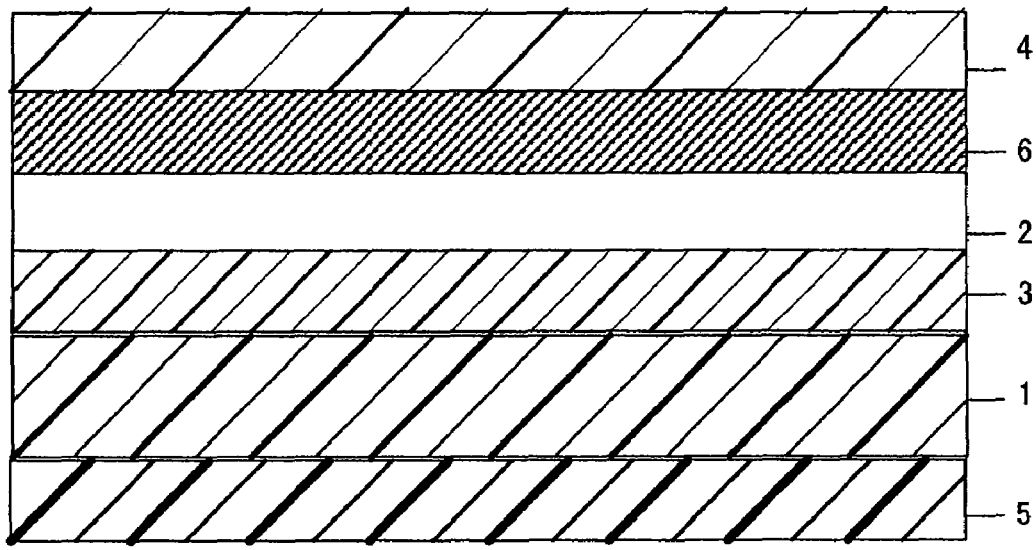
FIG. 3A
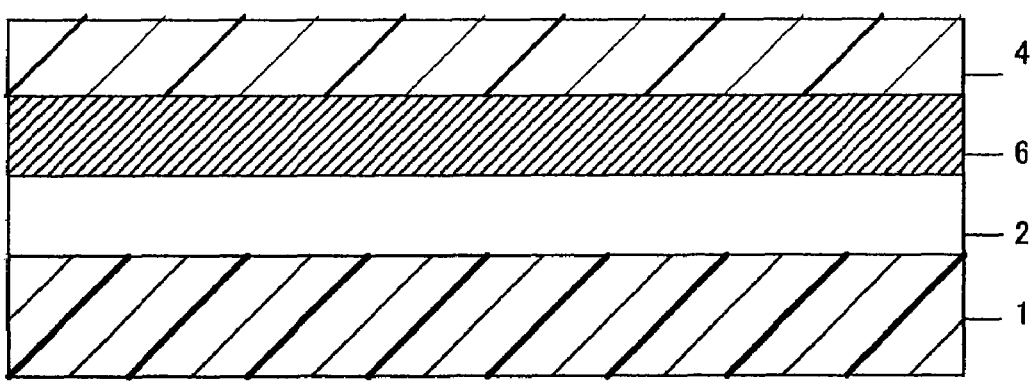

RECORDING AND REPRODUCING METHOD FOR DYE BASED RECORDABLE OPTICAL RECORDING MEDIUM AND APPARATUS USING THE SAME

CROSS-REFERENCE TO RELATED APPLICATIONS

This is a continuation of Application PCT/JP04/11984, filed on Aug. 20, 2004.

BACKGROUND OF THE INVENTION

1. Field of the Invention

The present invention relates to a recording and reproducing method for a dye-based recordable optical recording medium in which information can be recorded and reproduced by irradiating a dye-based recordable optical recording medium with a light beam to induce optical changes such as transmittance and reflectance to the recording layer thereof, and an apparatus for the recording and reproducing method.

2. Description of the Related Art

Recently, recordable digital versatile discs (DVD-R) have been developed for providing advanced large capacity optical discs. In order to enhance recording capacity of optical discs, it is necessary to develop recording materials to micronize recording pits, to adopt image compression formatting technologies as typified by MPEG2, and to develop technologies for shortening the wavelength of semiconductor lasers for reading recording pits.

Conventionally, as for semiconductor lasers of red wavelength regions, only AlGaInP laser diodes of a wavelength of 670 nm have been commercially utilized, for example, for barcode readers or instrumentation units. Nowadays, red lasers are remarkably expanding their markets in terms of optical storage products along with high-densification of optical discs. DVD drives are standardized at two wavelengths of 635 nm and 650 nm using laser diodes for their light sources, and DVD-ROM (Read Only Memory Digital Versatile Disc) drives of a wavelength of 650 nm are commercially available.

Typically, in dye-based recordable optical recording media where pits or marks are formed by use of heat mode, the pulse width and the recording power of a recording pulse train are optimized by emission of a laser during recording at a specific recording speed, thus there exist a problem that the marks and/or spaces are different at the other recording linear velocities. Namely, dye-based recordable optical recording media suffer from problems that jitter properties tend to degrade with time, because thermal capacity of heat pulses at the front edge required to form marks turns into insufficient, the heating temperatures are different from the optimal decomposing temperature, and thus average mark lengths are often varied, and the duty ratio of optimal heating pulse varies, mark widths are hardly uniform, and thus uniform mark widths cannot be obtained, resulting in thin marks or thick marks in accordance with mark lengths.

In addition, as for physical formats of DVD media, DVD-R media are standardized with a format of which the land portions of so-called land pre-pits are partially cut. According to the format, there are problems that when the land pre-pit signal (LPPb) is less than 0.16, pre-pit information such as pre-pit addresses cannot be properly reproduced; on the other hand, when the land pre-pit signal is more than 0.32, the land-pit signals themselves act noisily at data region, thus resulting in frequent occurrences of data errors. Accordingly, there is a disadvantage that the cut width should be adjusted with respect to each recording material by the use of a stamper, and the land cut width should be adjusted so as to control the land pre-pit signal within the range of 0.16 to 0.32.

In the prior art concerning optical recording media using a dye in the recording layer, there are optical recording media using polymethine dyes or combination of polymethine dyes and optical stabilizers as recording material; optical recording media using a layer formed from tetraazaporphyrin (porphyrazin) dye or a combination of cyanine dyes and azometalchelate dyes (salt forming dye) and a reflective layer as a recording layer; optical recording media using formazane (metal chelate) dye and the other dyes as the recording material; and optical recording media using dipyromethene (metal chelate) dye and the other dyes as the recording material. Further, there are many proposals known in the art which perform multi-pulse recording using dyes as the recording materials, however, as far as the inventors of the present invention know, there is no document found that one pulse recording is performed on dye-based recordable optical recording media while optimizing the recording waveform to perform recording at higher linear velocities, like the present invention.

SUMMARY OF THE INVENTION

It is therefore an object of the present invention is to provide a recording and reproducing method of which a proper recording waveform can be obtained to perform recording at high linear velocities on dye-based recordable optical recording media and an apparatus using the recording and reproducing method.

The recording and reproducing method and the apparatus of the present invention provide new formats on recordable DVD systems that utilize semiconductor lasers having shorter oscillating wavelength compared to CD media, which is an effective way to eliminate unrecorded regions at additionally recorded data portions similarly to LPP system, and also present an advantage that data errors are more hardly induced compared to DVD-R land pre-pit signal (LPPb) method, the data errors are caused due to precise control of fine cut width at preparing the stamper and/or due to LPP signal leaks into data portion.

The above-mentioned problems can be resolved by the following invention 1) to 17) (which are referred to as a first aspect to a seventeenth aspect of the present invention):

1) A recording and reproducing method for a dye-based recordable optical recording medium including recording shortest marks on a recording layer by the use of one pulse which is more highly energized than pulses of each of marks other than the shortest marks, recording each of the third shortest marks and still longer marks by the use of one pulse beam of which the rear edge is energized for a given length of time, and the energized pulse power is equal to the pulse power of each of the second shortest marks, and irradiating cooling pulses onto the backwards of the respective pulse beams of all the marks during recording at an optical energy of 0.1 mW or less for a given length of time, wherein the dye-based recordable optical recording medium is provided with a substrate and the recording layer formed on the substrate, the substrate is provided with a guide groove with a wobble formed thereon, and the recording layer contains an organic dye as the main component.

2) The recording and reproducing method for a dye-based recordable optical recording medium according to item 1), wherein the third shortest marks and still longer marks are recorded by the use of one pulse beam of which two sites of the front and rear edges are energized for a given length of time, and the energized pulse power is equal to the pulse power of each of the second shortest marks.

3) The recording and reproducing method for a dye-based recordable optical recording medium according to item 1), wherein the duration to irradiate the cooling pulse onto the backwards of the respective pulse beams is ⅙ to ⅚ of the duration of the shortest space.

4) The recording and reproducing method for a dye-based recordable optical recording medium according to item 1), wherein the heating pulse width of a recording pulse forming a mark of which the space just before the mark is the shortest is distinguished depending on whether the mark is the shortest or not, and the heating pulse width of the shortest mark is determined to be longer than the heating pulse width of marks other than the shortest mark; and the heating pulse width of a recording pulse forming the shortest mark is distinguished depending on whether the space just before the mark is the shortest or not, and the heating pulse width of the mark of which the space just before the mark is the shortest is determined to be shorter than the heating pulse width of the mark of which the space just before the mark is not the shortest.

5) The recording and reproducing method for a dye-based recordable optical recording medium according to item 1), wherein the wobble has a frequency equivalent to 4T to 96T when the basic clock cycle is represented by "T".

6) The recording and reproducing method for a dye-based recordable optical recording medium according to item 1), wherein a ratio between the wobble amplitude "Wo" and the push-pull signal amplitude "PP" being a difference in signals determined by means of a 2-divided photodetector for detecting track errors for controlling is determined to be in a range of $0.1 \leq Wo/PP \leq 0.4$ to perform synchronization.

7) The recording and reproducing method for a dye-based recordable optical recording medium according to item 1), wherein the wavelength of the recording beam is 600 nm to 720 nm.

8) The recording and reproducing method for a dye-based recordable optical recording medium according to item 1), wherein the refractive index "n" and the extinction coefficient "k" of the recording layer are in respective ranges of $1.5 \leq n \leq 3.0$ and $0.02 \leq k \leq 0.2$ with respect to light beams with a wavelength range of a wavelength of pulse beam for recording and reproducing ±5 nm.

9) The recording and reproducing method for a dye-based recordable optical recording medium according to item 1), wherein the initial decomposition temperature of the recording layer is 100° C. to 360° C.

10) The recording and reproducing method for a dye-based recordable optical recording medium according to item 1), wherein the dye-based recordable optical recording medium is provided with at least one layer selected from a reflective layer, a protective layer, an adhesive layer, a protective substrate, and a hard-coat layer on the substrate surface, on the substrate, besides the recording layer.

11) The recording and reproducing method for a dye-based recordable optical recording medium according to item 10), wherein the dye-based recordable optical recording medium is provided with at least the reflective layer besides the recording layer, and the reflective layer contains any one of Au, Ag, and Al, or contains an alloy selected from those containing any one of Au, Ag, and Al as the main component.

12) The recording and reproducing method for a dye-based recordable optical recording medium according to item 10), wherein the dye-based recordable optical recording medium is provided with at least the protective layer besides the recording layer, and the protective layer contains an ultraviolet curable resin.

13) The recording and reproducing method for a dye-based recordable optical recording medium according to item 10), wherein the adhesive layer is provided between two substrates at least one of which has a guide groove with a wobble formed thereon so as to form a recording medium having two substrate surfaces, and an adhesive agent used for the adhesive layer is an ultraviolet curable resin.

14) A recording and reproducing apparatus including
a shortest mark recording function configured to record shortest marks on a recording layer of a dye-based recordable optical recording medium having a wobble in a guide groove formed on a substrate by the use of one pulse which is more highly energized than pulses of each of marks other than the shortest marks, a third mark or still longer mark recording function configured to record each of the third shortest marks and still longer marks by the use of one pulse beam of which the rear edge is energized for a given length of time, and the energized pulse power is equal to the pulse power of each of the second shortest marks, and a cooling pulse irradiating function configured to irradiate cooling pulses onto the backwards of the respective pulse beams of all the marks during recording at an optical energy of 0.1 mW or less for a given length of time, wherein the dye-based recordable optical recording medium is provided with a substrate and the recording layer formed on the substrate, the substrate is provided with a guide groove with a wobble formed thereon, and the recording layer contains an organic dye as the main component.

15) The recording and reproducing apparatus according to item 14), wherein the third mark or still longer mark recording function is configured to record each of the third shortest marks and still longer marks by the use of one pulse beam of which two sites of the front and rear edges are energized for a given length of time, and the energized pulse power is equal to the pulse power of each of the second shortest marks.

16) The recording and reproducing apparatus according to item 14), wherein the duration to irradiate the cooling pulse onto the backwards of the respective pulse beams is ⅙ to ⅚ of the duration of the shortest space. 17) The recording and reproducing apparatus according to item 14), further including a function configured to distinguish the heating pulse width of a recording pulse forming a mark of which the space just before the mark is the shortest depending on whether the mark is the shortest or not to determine the heating pulse width of the shortest mark to be longer than the heating pulse width of marks other than the shortest mark, and to distinguish the heating pulse width of a recording pulse forming the shortest mark depending on whether the space just before the mark is the shortest or not to determine the heating pulse width of the mark of which the space just before the mark is the shortest to be shorter than the heating pulse width of the mark of which the space just before the mark is not the shortest.

BRIEF DESCRIPTION OF THE DRAWINGS

FIG. 1A is a view exemplarily showing a layer structure of a conventional recordable optical recording medium.

FIG. 1B is a view exemplarily showing another layer structure of a conventional recordable optical recording medium.

FIG. 1C is a view exemplarily showing still another layer structure of a conventional recordable optical recording medium.

FIG. 1D is a view exemplarily showing further still another layer structure of a conventional recordable optical recording medium.

FIG. 2A is a view exemplarily showing a layer structure of a conventional recordable CD-R medium.

FIG. 2B is a view exemplarily showing another layer structure of a conventional recordable CD-R medium.

FIG. 2C is a view exemplarily showing still another layer structure of a conventional recordable CD-R medium.

FIG. 3A is a view exemplarily showing a layer structure of a dye-based recordable DVD medium.

DESCRIPTION OF THE PREFERRED EMBODIMENTS

Figure 3B:
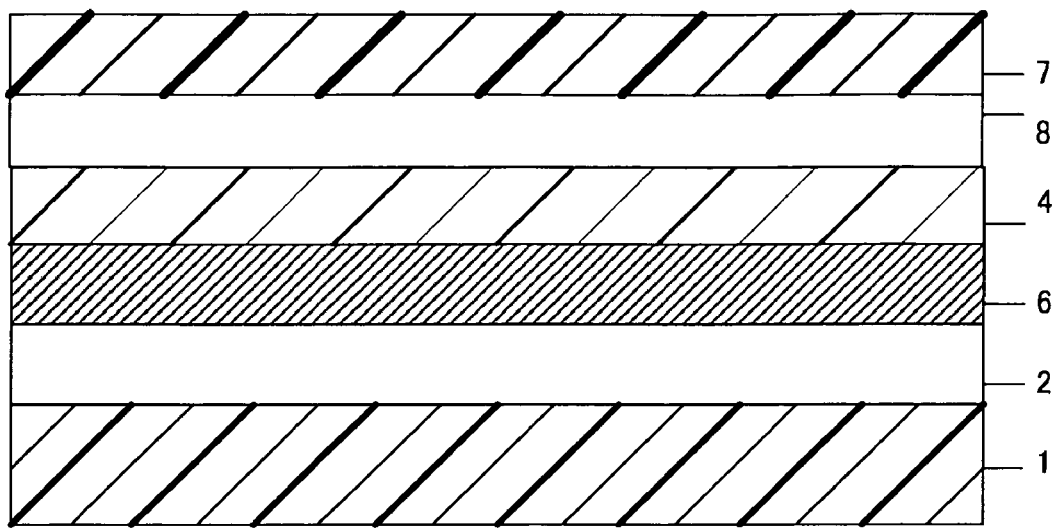
FIG. 3B is a view exemplarily showing another layer structure of a dye-base recordable DVD medium.

Hereinafter, the present invention will be described in detail:

The first aspect and the second aspect of the present invention specify basic patterns of optimum irradiation of pulses in a recording and reproducing method for a dye-based recordable optical recording medium in which information is recorded by the use of a pulse beam, and the recorded information is reproduced by the use of a reproducing beam. With respect to the third shortest marks or still longer marks i.e. the marks other than the shortest marks and the second shortest marks, the length of pulses of which additional power is applied to the rear edges or the front and rear edges to energize is particularly preferably 0.5 times to 2 times the basic clock cycle T, i.e. 0.5T to 2T, and the length of pulses of 0.2T to 2.5T are also usable. The amount of optical energy of pulses of the shortest marks needs to be larger than that of other than the shortest marks, and when power of the shortest marks is represented by W0, power of the second shortest marks and power additionally applied to the third shortest marks or still longer marks is represented by W1, and power to which no power is additionally applied is represented by W2, it is possible to employ the amount of optical energy of W0/W1 within the range of 1.01 to 2.00 (W0/W1=1.01 to 2.00), and preferably within the range of W0/W1=1.02 to 1.50. On the other hand, the amount of optical energy of W1/W2 can be employed within the range of 1.05 to 3.00, and it is preferably within the range of 1.08 to 2.00.

The third aspect of the present invention specifies a preferred condition for irradiation of a cooling pulse to be applied to the backwards of respective pulse beams, and it is preferable that the duration to irradiate the cooling pulse onto the backwards of the respective pulse beams be set to be ⅙ to ⅚ of the shortest space length. When the duration to irradiate the cooling pulse deviates from the range, the effect of the present invention is hardly obtained.

By selecting a pulse waveform from those described above, excellent recording is enabled with low jitter property particularly at high-linear recording velocities.

When recording at high-linear recording velocities is tried to realize, dye-based optical recording media require a large amount of application of recording power, and consequently, thermal influence between marks more easily occur. Then, in order to sharpen well mark edges at the timer of forming marks, the present invention is effectively used.

When recording is performed as conventionally done, a power gap arises between the power at which the lowest jitter can be obtained and the power at which error is small, resulting in a reduced power margin. Specifically, the recording power at which the lowest jitter is obtainable in higher linear recording tends to lead the asymmetry of recording signals to minus side and tends to cause errors even at lower jitter. For example, when even the media are of minus asymmetry, lower jitter, and less errors, the media are likely to gradually cause more errors with time than the media of which recording is performed at nearly zero of asymmetry. The aspects of the present invention may address the problems due to lower asymmetry.

In a method that one mark is recorded by use of a plurality of pulses or multi pulses, it may possibly solve the problems associated with the lower asymmetry when the pulse beam is optimized. However, a plurality of laser pulses will cause fluctuation in rising duration and falling duration of pulse beams, possibly resulting in fluctuation of recording quality. The higher is the linear recording, the more significant will be the fluctuation.

On the contrary, in the present invention, the method to record one mark by use of one pulse may bring about an advantage that the fluctuation of recording quality is lower than the multi pulse method described above. Further, in address detection during the recording according to the present invention, the recording waveform being simpler than that of the multi pulse method may allow to easily equalize the optical quantity at recording, and may allow address detection while equalizing not only the reflected optical quantity at spaces but also the optical quantity at marks, and also the address detection may be relatively easily carried out advantageously even when cooling pulse of 0.1 mW or less is provided at the rear end of the pulse.

Figure 6:
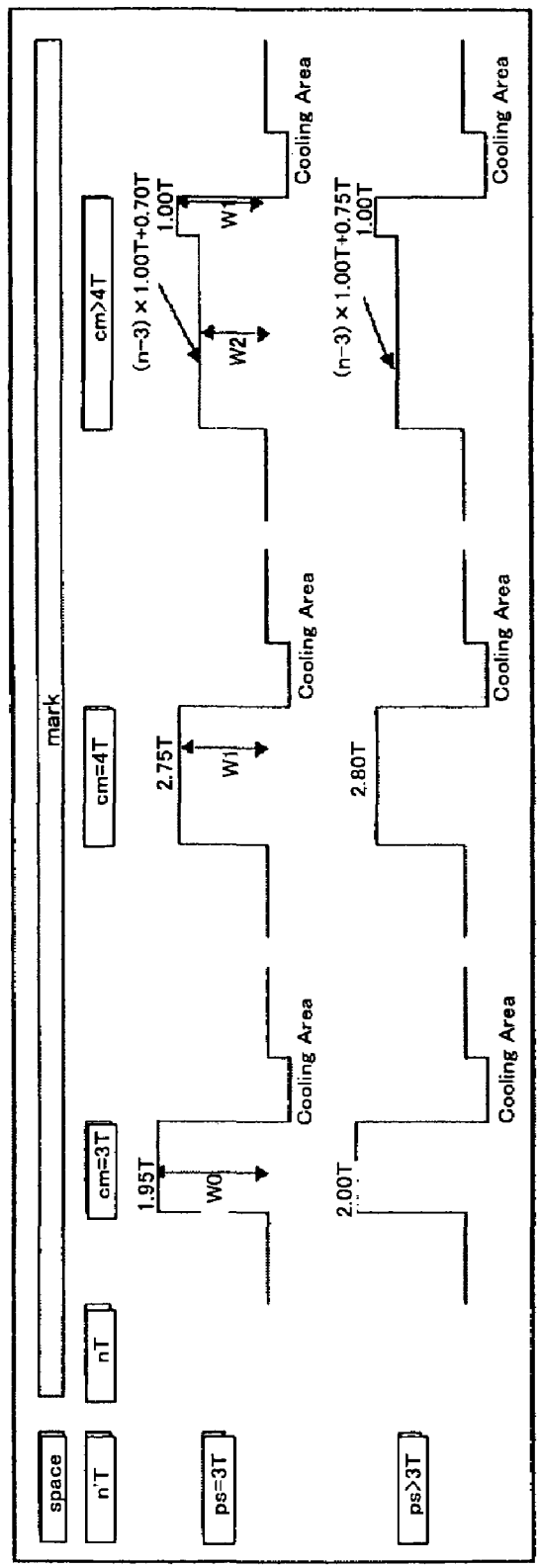
FIG. 6 is a view exemplarily showing power control waveforms according to the first aspect of the present invention at a recording linear velocity of 28 m/sec.
Figure 8:
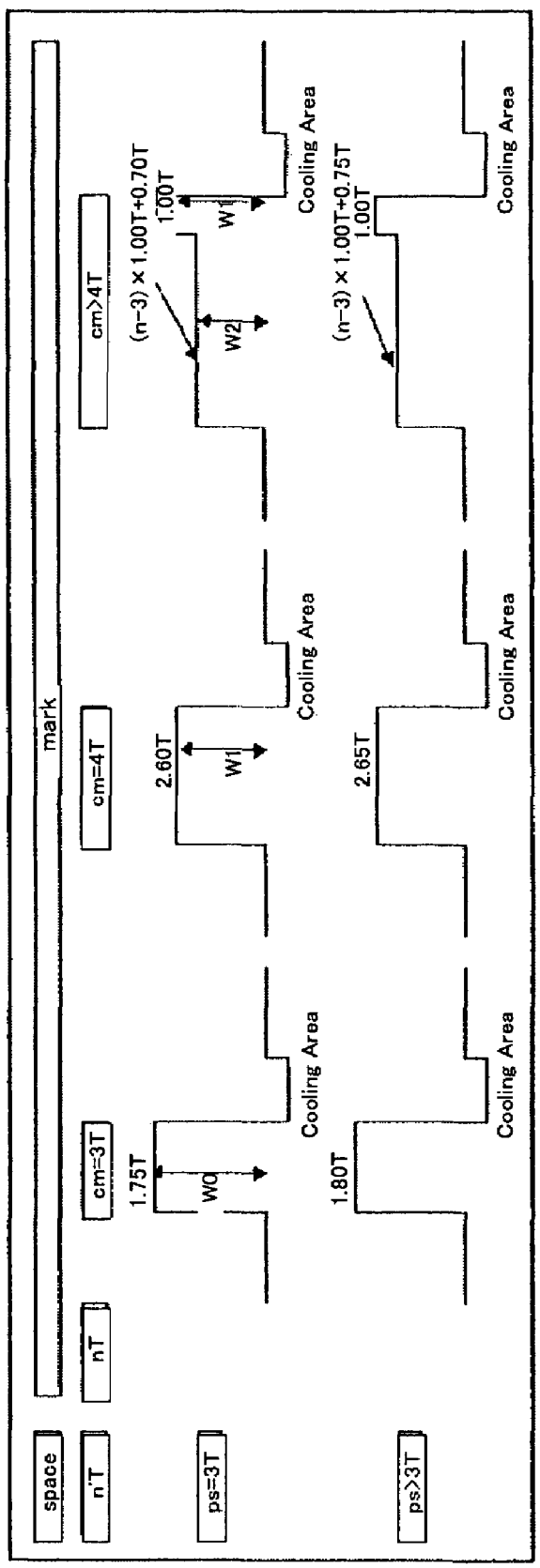
FIG. 8 is a view exemplarily showing power control waveforms according to the first aspect of the present invention at a recording linear velocity of 21 m/sec.

FIGS. 6 and 8 exemplarily show recording waveforms according to the first aspect of the present invention. In the case, only pulses of the shortest marks and the second shortest marks have simple rectangular waves, the pulses of the shortest marks are energized, and the rear edges of pulses of each of the third shortest marks and still longer marks are energized with a power being lower than the power of the shortest marks. As for the parameters of the rear edges of the pulses of each of the third shortest marks and still longer marks, by energizing only the rear edges of the pulses, virtually common parameters can be advantageously selected, and advantageously, the parameters can be easily extracted into practically used drives, however, from the viewpoint of optical recording media, the recording waveforms are required to be simplified and to bring excellent jitter property.

Figure 7:
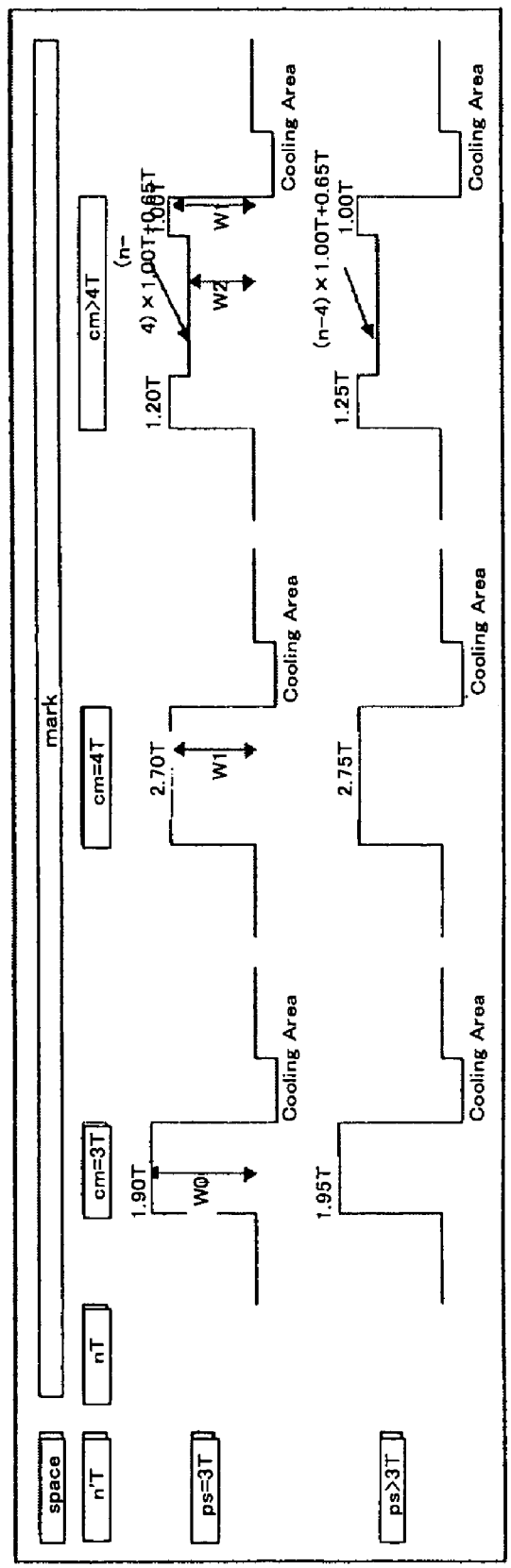
FIG. 7 is a view exemplarily showing power control waveforms according to the second aspect of the present invention at a recording linear velocity of 28 m/sec.
Figure 9:
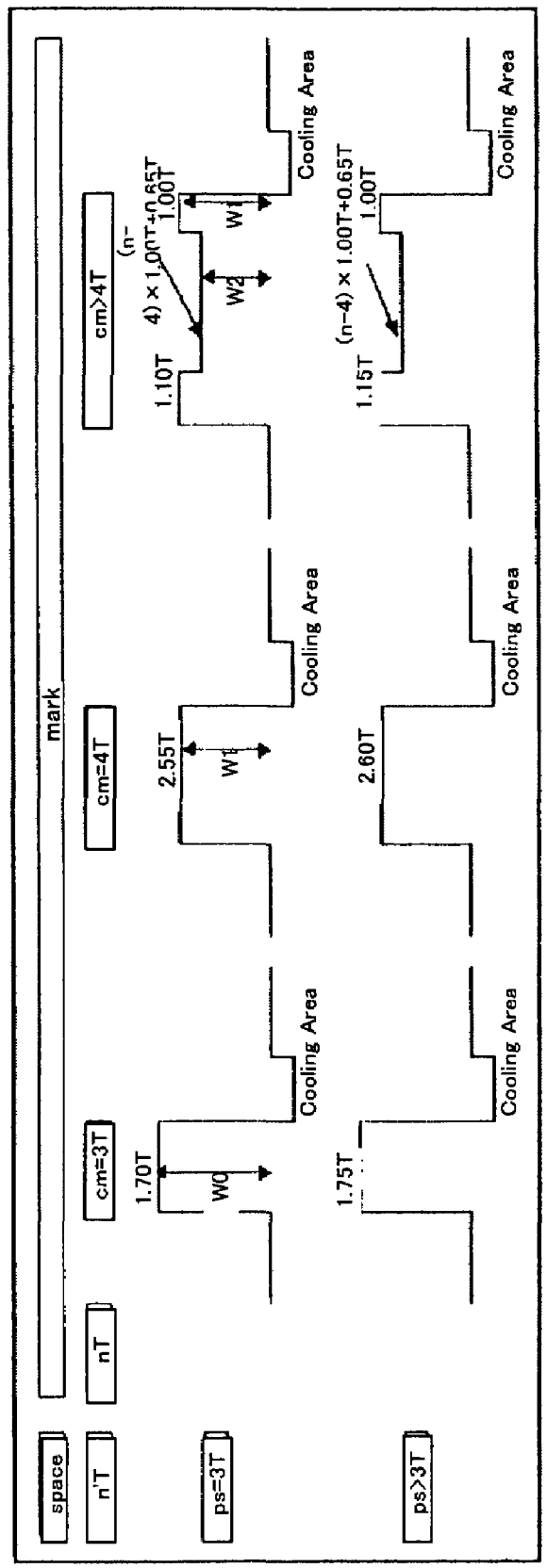
FIG. 9 is a view exemplarily showing power control waveforms according to the second aspect of the present invention at a recording linear velocity of 21 m/sec.

FIGS. 7 and 9 exemplarily show recording waveforms according to the second aspect of the present invention. In the case, only pulses of the shortest marks and the second shortest marks have simple rectangular waves, the pulses of the shortest marks are energized, and two sites of the front and rear edges of pulses of each of the third shortest marks and still longer marks are energized with a power being lower than the power of the shortest mark. Compared to the first aspect, the second aspect of the present invention requires energizing the two sites of pulses of each of the third shortest marks and still longer marks, which burdens extraction of parameters into practically used drive, however, from the viewpoint of optical recording media, it has an advantage that proper jitter property can be easily obtained.

Figure 4:
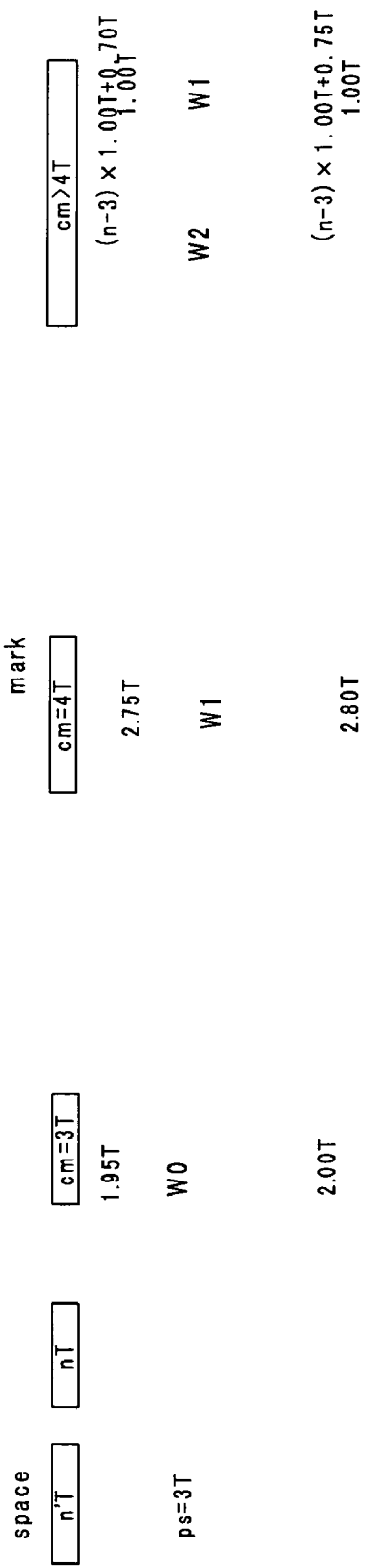
FIG. 4 is a view exemplarily showing power control waveforms according to the first aspect of the present invention at a recording linear velocity of 28 m/sec.
Figure 5:
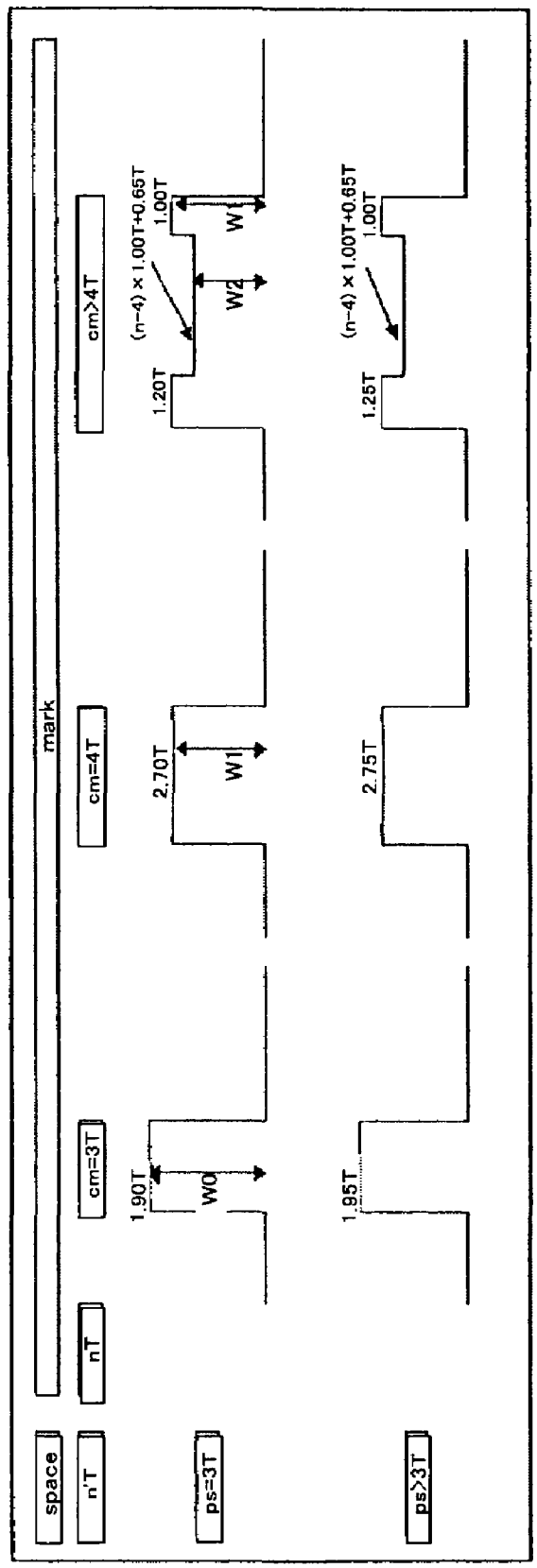
FIG. 5 is a view exemplarily showing power control waveforms according to the second aspect of the present invention at a recording linear velocity of 28 m/sec.

In FIGS. 6 to 9, (same applies to in FIGS. 5 and 4), "space" represents a space; "mark" represents a mark; "Cooling Area" represents a cooling area; "T" represents a basic clock cycle; "n" and "n" respectively is an integer of 3 or more; "ps" represents the space length of the space just before the mark; "cm" represents a recording mark length; "W0" represents the recording power of the shortest mark; "W1" represents the power of the second shortest mark or the added power of the third shortest marks or still longer marks; and "W2" represents the power of the third shortest marks and still longer marks without the added power.

In view of thermal influence, the heating pulse width of a recording pulse forming a mark of which the space just before the mark is the shortest is distinguished depended on whether the length of the mark is the shortest or not to set the heating pulse width of the shortest mark to be longer than the heating pulse width of marks other than the shortest mark (an example will be described hereinafter in Table 1, see the case where the space length of the space just before the mark is 3T and the recording mark length is 3T or 4T to 14T). With this configuration, recording with lower jitter property can be achieved.

Further, the heating pulse width of a pulse forming the shortest mark is distinguished depending on whether the space just before the mark is the shortest or not, and the heating pulse width of the mark of which the space just before the mark is the shortest is determined to be shorter than the heating pulse width of the mark of which the space just before the mark is not the shortest (an example will be described hereinafter in Table 1, see the case where the recording mark length is 3T and the space length of the space just before the mark is 3T or 4T to 14T). With this configuration, recording with further lower jitter property can be achieved.

The compensation level or duration to control the heating pulse width of the mark to be longer than that of the other marks is particularly preferably in the range of 0.02 to 0.10T. When the space just before the mark to be recorded is of the shortest, and when the pulse width of the pulse forming the mark is approximately the same as the pulse width of the other marks, the space length of the space just before the mark turns to be shortened due to thermal influence, and the jitter may be somewhat degraded. Then, only in such a case, shortening of the heating pulse width of marks to be recorded may effectively shorten the pulse width. Further, when the pulse width is to be shortened, the shortening of the front edge of the heating pulse may effectively shorten the pulse width.

By the way, when the space just before a mark to be recorded is of the shortest, and when the heating pulse width of the pulse to form the mark is less than 0.10T, it is not favorable because this may result in an excessively short mark.

Preferably, the compensation level or duration to control the heating pulse width of the shortest mark to be longer than that of the other marks is 0.05T to 0.25T. When the recording linear velocity is high in particular, shortest marks are hardly formed with ease, and thus the compensation to make long the pulse width of the shortest mark may bring about recording with lower jitter.

Specific examples of the compensation of the heating pulse width of marks are shown in Table 1.

TABLE 1

|  |  | Mark length to be recorded | |
|---|---|---|---|
|  |  | 3 T | 4 T to 14 T |
| Space length of the space just before a mark to be recorded | 3 T | ±0.00 T | −0.05 T |
|  | 4 T to 14 T | +0.05 T | ±0.00 T |

Next, as essential items of the recording layer, there are optical properties.

As for the optical properties of the recording layer, with respect to beams at long wavelengths near wavelengths of recording and reproducing, namely, at wavelengths of recording beams and reproducing beams ±5 nm, it is preferred that a single recording layer have a refractive index "n" of $1.5 \leq n \leq 3.0$ and an extinction coefficient "k" of $0.02 \leq k \leq 0.2$. When the value "n" is less than 1.5, it is unfavorable because sufficient optical changes are hardly obtained, and the recording modulation degree lowers. When the value "n" is more than 3.0, it is unfavorable because the dependency on wavelength is exceedingly high, and errors occur even at wavelengths of recording and reproducing. In addition, when the value "k" is less than 0.02, it is unfavorable because it results in a degraded recording sensitivity. When the value "k" is more than 0.2, it is also unfavorable because a 50% or more reflectance is hardly obtainable.

DVD-ROM are typically standardized at near the wavelength of 650 nm; the wavelength of the pulse beam for recording media is standardized at 650 to 660 nm for popular applications besides 635 nm for authoring exclusive media. However, these wavelengths are center wavelengths, namely each of the wavelengths may be larger or smaller depending on the fluctuations at producing the semiconductor laser diode (LD). Further, LDs typically tend to inherently increase the wavelength when temperature rises. The recording layer in the present invention is applicable within the wavelength range of 600 nm to 720 nm including the range described above.

Next, wobble properties of the wobbling guide groove to be formed on the substrate will be described. The basic clock cycle T for determining the wobble frequency is about 0.133 µm or about 38 nsec in the case of 4.7 GB DVD media.

Typically, for the frequency band of wobble, a basic clock cycle being equal to 150T to 400T is used. The frequency band may not be suitable for high density recording when data is added to be recorded by frequency modulation or phase modulation since significant spaces inevitably exist between the prior data and the data to be additionally recorded. In order to remove this disadvantage, LPP is provided with recordable DVD-R, and the sites to be recorded with data are controlled by the LPP signals.

However, in the controlling by the LPP, there are disadvantages that signals may not be read properly when the signal amplitude from LPP is excessively small, on the contrary, when the LPP signal is excessively large, data errors arise frequently due to leakage of LPP signals into recording data. In order to avoid the disadvantages, the optimum signal amplitude is limited to $0.16 < LPPb \leq 0.32$ in LPP and preferably $0.18 \leq LPPb \leq 0.26$ in LPP. Accordingly, the cut width of lands should be controlled precisely at preparing the stamper.

By the way, the employment of a high-frequency wobble can bring about that the LPP is unnecessary no longer, and synchronization is performed by modulating the wobble, therefore, frequent data errors may be avoided as seen in LPP method.

The preferred wavelength of the wobble is, as specified as in the fifth aspect of the present invention, 4T to 96T. When the wobble frequency is less than 4T, the detection is likely to be difficult due to excessively low frequency, and the reliability as to rotation control and address detection may be insufficient, and when the wobble frequency is more than 96T, the space intervals between additionally recorded data is excessively wide, resulting in a reduced capacity or an insufficient data processing speed.

As for the wobble amplitude of the recordable optical recording media in the present invention, when the ratio of wobble amplitude Wo after passing through appropriate filters such as high filter at 4 MHz and low filter at 30 kHz to push-pull amplitude PP after passing through a filter at 30 kHz, i.e. Wo/PP, satisfies the relation $0.1 \leq Wo/PP \leq 0.4$, the synchronization is relatively easy, and is preferably $0.15 \leq Wo/PP \leq 0.3$.

When Wo/PP is less than 0.1, the signal intensity is insufficient to synchronize, and when Wo/PP is more than 0.4, the data errors tend to increase. In this type, the optical recording media having larger LPP do not cause significantly data errors compared to LPP type, i.e. data errors tend to increase gradually along with the increase of wobble amplitude.

In the preparation of the stamper, the LPP type requires precise cut width control in order to adjust the LPP cut width into 0.16 to 0.32, whereas the wobble type in the present invention requires no more than the control of high-frequency source and swing level in a high-frequency wobble method (the swing level of the wobble can be arbitrarily controlled to gain excellent reproducibility in the circuit to control the swing level), therefore, the yields of stampers and optical recording media can be increased remarkably.

As for the groove shape of the substrate on which the format is formed, the groove depth is preferably 1,000 angstroms to 2,500 angstroms, and more preferably 1,500 angstroms to 2,000 angstroms in the case that recording layers are formed using an organic dye by solvent coating processes. When the groove depth is less than 1,000 angstroms, the tracking may not be controlled appropriately due to insufficient push-pull signals, and then the grove depth is more than 2,500 angstroms, it is unfavorable because the transferring ability may be deteriorated at molding substrates.

Preferably, as for the dye groove depth d1 when a dye recording layer is provided, the following relation is preferable:

$$1200 \leq d1 \times m \leq 160000$$

where mT: wobble frequency (m: natural number) When (d1×m) is less than 1,200, the differential signals are insufficient, the tracking may not be performed appropriately at recording and reproducing, and when (d1×m) is more than 160,000, oscillation may be induced that may adversely effect on the tracking. By the way, the groove depth of substrates are typically limited by the transferring limit due to the substrate molding described above, thus the groove depth is limited to 160,000 or less in practice.

The pitch of tracks is typically required to be 0.64 µm to 0.8 µm in order to assure the recording density of 4 GB to 5 GB. The groove width depends on the recording material in general; usually the half-width is 0.18 µm to 0.40 µm in almost all organic materials.

Next, the following describes the layer structure of the dye-based recordable optical recording media intended for the present invention, and the essential properties and the constitutional materials thereof.

Figure 3C:
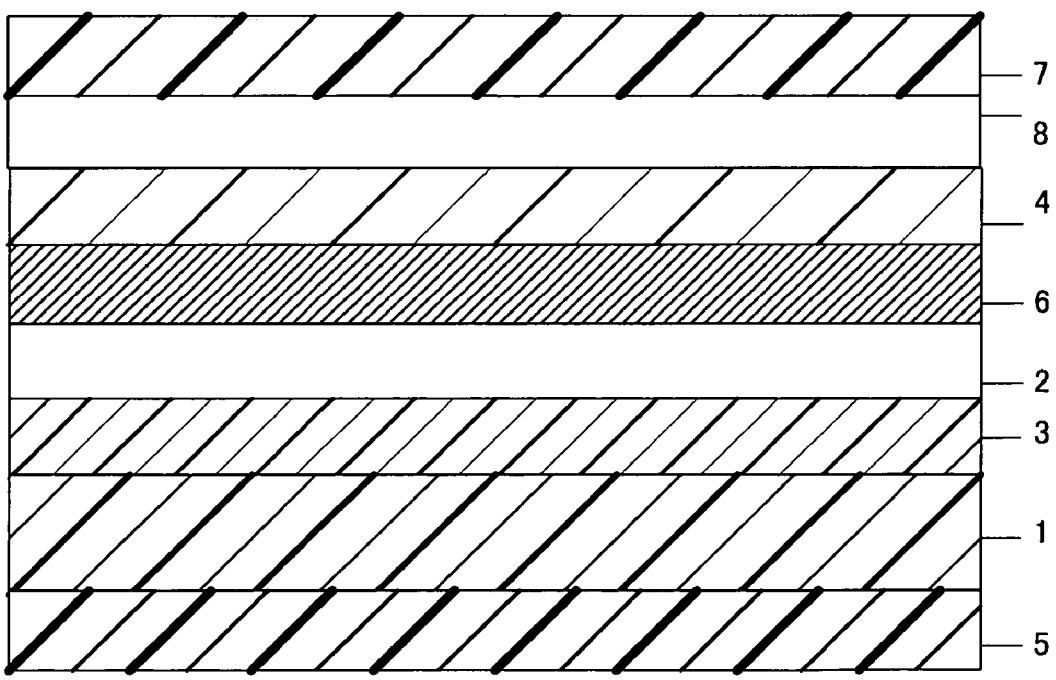
FIG. 3C is a view exemplarily showing still another layer structure of a dye-base recordable DVD medium.

FIGS. 1A to 1D exemplarily show a layer structure of a conventional recordable optical disc, respectively, FIGS. 2A to 2C exemplarily show a layer structure of a conventional CD-R medium, respectively, and FIGS. 3A to 3C exemplarity show a layer structure of a recordable DVD medium, respectively. The dye-based recordable optical recording medium of the present invention preferably has a basic layer structure in which first substrate 1 and second substrate (or protective substrate) 7 are bonded with an adhesive so as to sandwich recording layer 2 therebetween, as shown in FIGS. 3B and 3C.

FIG. 1A shows an aspect in which the recording layer 2 is formed on the substrate 1; FIG. 1B shows an aspect in which undercoat layer 3 is formed under the recording layer 2; FIG. 1C shows an aspect in which protective layer 4 is further formed on the recording layer 2; and FIG. 1D shows an aspect in which hard-coat layer 5 is formed on the opposite surface of the substrate 1. FIG. 2A shows an aspect in which recording layer 2, reflective layer 6, and protective layer 4 are formed on substrate 1; FIG. 2B shows an aspect in which the layer structure shown in FIG. 2A further includes undercoat layer 3; and FIG. 2C shows an aspect in which the layer structure shown in FIG. 2B further includes hard-coat layer 5. In addition, FIG. 3A shows an aspect in which recording layer 2, reflective layer 6, and protective layer 4 are formed on substrate 1; FIG. 3B shows an aspect in which the layer structure shown in FIG. 3A further includes adhesive layer 8 and protective substrate 7; and FIG. 3C shows an aspect in which the layer structure shown in FIG. 3B further includes undercoat layer 3 on the recording layer 2, and hard-coat layer 5 on the opposite surface of the substrate 1.

The recording layer may be an organic dye layer alone or may be formed in a laminar structure of an organic dye layer for enhancing reflectance and a reflective layer. The undercoat layer 3 or the protective layer 4 may be formed between the recording layer 2 and the substrate 1, and in order to enhance properties of recordable optical discs, each of the individual layers may be formed with two or more layers in a laminar structure. The most typically used layer structure is formed with a first substrate, an organic dye layer, a reflective layer, a protective layer, an adhesive layer, and a second substrate (protective substrate).

Substrate

When recording and/or reproducing is performed from the substrate side, the substrate must be transparent to laser beams, however, when recording and/or reproducing is performed from the recording layer side, the substrate is not necessarily transparent to laser beams. Examples of materials available for the substrate include plastics such as polyester resins, acrylic resins, polyamide resins, polycarbonate resins, polyolefin resins, phenol resins, epoxy resins, and polyimide resins; glasses, ceramics, and metals. On the surface of the substrate, a guide groove or a guide pit for tracking, and a preformat such as address signals may be formed.

Recording Layer

On the recording layer, somewhat optical changes are induced by irradiation of a laser beam, and information is recorded by means of the optical changes. A material containing an organic dye as the main component is used for the recording layer. Here, the term "the main component" means that an organic dye in a sufficient amount for recording and reproducing information is contained, and typically, only an organic dye or organic dyes are used except for a small amount of additives to be suitably added in accordance with the necessity.

Examples of the organic dyes include azo dyes, formazan dyes, dipyrromethene dyes, (poly)methyne dyes, naphtalocyanine dyes, phtalocyanine dyes, tetraazaporphyrin dyes, squarylium dyes, chloconium dyes, pyrylium dyes, naphthoquinone dyes, anthraquinone dyes (indanthrene dyes), xanthene dyes, triphenylmethane dyes, azulene dyes, tetrahydrocoline dyes, phenanthrene dyes, triphenothiazine dyes, and metal complexes thereof. Among these dyes, azo(metalchelate) dyes, formazan(metalchelate) dyes, squarylium(metalchelate) dyes, dipyrromethene(metalchelate) dyes, trimethynecyanine dyes, tetraazaporphyrin dyes, and metal complexes thereof are preferable.

With respect to the thermal decomposition property of these dyes, the initial decomposition temperature or kick-off temperature is preferably 100° C. to 360° C., and particularly preferably 100° C. to 350° C. When the kick-off temperature is more than 360° C., the pits may not formed successfully, thus the jitter property may be lowered, and when the kick-off temperature is less than 100° C., the storage stability of discs may be deteriorated.

The dyes described above may be added with other organic dyes, metals, and/or metal compounds in order to improve the optical properties, recording sensitivity and/or signal properties, or a dye-layer and a layer containing other organic dyes, metals, and/or metal compounds may be formed as a recording layer in a laminar structure.

Examples of such additional metals and metal compounds include In, Te, Bi, Se, Sb, Ge, Sn, Al, Be, $TeO_2$, SnO, As and Cd. Each of these metals and metal compounds may be dispersed and mixed for use.

Further, in the dye materials described above, for example, polymer materials such as ionomer resins, polyamide resins, vinyl resins, natural polymers, silicones, and liquid rubbers; silane coupling agents may be dispersed and mixed, or for the purpose of improving properties, stabilizers such as transition metal complexes, dispersing agents, flame-retardants, lubricants, antistatic agents, surfactants, and plasticizers may be used along with the dye materials.

The recording layers may be formed by conventional methods such as vapor deposition method, sputtering method, CVD method, and coating method. The coating method may be carried out by dissolving materials described above in an organic solvent to form a coating liquid, then the coating liquid is processed by conventional coating method such as spray coating, roller coating, dip coating, and spin coating. Examples of the organic solvent for use include alcohols such as methanol, ethanol, and isopropanol; ketones such as acetone, methyl ethyl ketone, and cyclohexanone; amides such as N,N-dimethylformamide and N,N-dimethylacetamide; sulfoxide such as dimethylsulfoxide; ethers such as tetrahydrofuran, dioxane, diethylether, and ethyleneglycol monomethylether; esters such as methyl acetate and ethyl acetate; halogenated hydrocarbons such as chloroform, methylene chloride, dichloroethane, carbon tetrachloride, and trichloroethane; aromatics such as benzene, xylene, monochlorobenzene, and dichlorobenzene; cellosolve such as methoxy ethanol, ethoxy ethanol; and hydrocarbons such as hexane, pentane, cyclohexane, and methyl cyclohexane.

The thickness of the recording layer is appropriately 100 angstroms to 10 µm, and preferably 200 angstroms to 2,000 angstroms.

Undercoat Layer

The undercoat layer is disposed for the purposes of (1) improving the adhesion, (2) serving as a barrier layer against water or gases, (3) improving the shelf life of the recording layer, (4) improving the reflectivity of the recording layer, (5) protecting the substrate from solvents, and/or (6) forming guide grooves, guide pits, pre-formats, and the like. To attain the above-noted purpose (1), various polymer compounds such as ionomer resins, polyamide resins, vinyl resins, natural resins, natural polymers, silicones, and liquid rubbers, and silane coupling agents may be employed. To attain the purposes (2) and (3), inorganic compounds such as SiO, $MgF_2$, $SiO_2$, $TiO_2$, ZnO, TiN, and SiN can be used in addition to the above-described polymer materials. Further, metals and semimetals such as Zn, Cu, Ni, Cr, Ge, Se, Au, Ag, and Al can be used. To attain the purpose (4), metals such as Al and Ag, and organic thin films having a metal luster such as methine dye and xanthene dye may be used. To attain the purposes (5) and (6), an ultraviolet-curing resin, a thermosetting resin, and a thermoplastic resin can be used.

The thickness of the undercoat layer may be properly selected depending on the application; preferably, the thickness is 0.01 µm to 30 µm, and more preferably 0.05 µm to 10 µm.

Reflective Layer

Examples of materials of the reflective layer include metals and semimetals exhibiting high reflectivity corrosion resistance such as Au, Ag, Cr, Ni, Al, Fe, and Sn. Among these metals, Au, Ag, and Al are particularly preferred in view of the reflectivity and the productivity. These metals and semimetals may be used alone or in combination of two or more as an alloy.

The reflective layer may be formed by deposition, sputtering or the like. The thickness of the reflective layer is typically 50 angstroms to 5,000 angstroms, and preferably 100 angstroms to 3,000 angstroms.

Protective Layer and Hard Coat Layer

The protective layer and the hard coat layer on the substrate surface may be provided in order to (1) protect the recording layer or the reflection absorbing layer from scratches, dust, and contamination, (2) improve the shelf life of the recording layer or the reflection absorbing layer, and (3) improve the reflectivity. To satisfy these purposes, materials similar to those used for the undercoat layer may be used. In addition, organic materials of thermoplastic materials, thermosetting materials, and UV curable resins are available such as polymethacrylate resins, polycarbonate resins, epoxy resins, polystyrene resins, polyester resins, cellulose resins, aliphatic hydrocarbon resins, aromatic hydrocarbon resins, natural rubber, styrene-butadiene resins, chloroprene rubbers, waxes, alkyd resins, drying oils, and rosins. Among these, UV curable resins are preferable from the view point of the superiority of productivity.

The thickness of the protective layer or the hard coat layer is typically 0.01 μm to 30 μm, and preferably 0.05 μm to 10 μm.

The protective layer or the hard coat layer on the substrate surface may contain stabilizers, dispersing agents, flame-retardants, lubricants, antistatic agents, surfactants, and plasticizers as is the case with the recording layer.

Protective Substrate

The protective substrate is required to be transparent to laser beams when the laser beam is irradiated through the substrate, however, when the protective substrate is used for protective purpose, the transparency is not required. The materials for the protective substrate are utterly the same as those for the substrate; for example, plastics such as polyesters, acrylic resins, polyamides, polycarbonate resins, polyolefin resins, phenol resins, epoxy resins, and polyimides; glass, ceramics, metals, and the like may be used.

Adhesive Layer

The material of the adhesive layer may be suitably selected, provided that the two recording media can be bonded together, and the material of the adhesive layer is selected from UV curable adhesives and hot-melt adhesives in consideration of productivity.

Hereinafter, the recording and reproducing apparatus of the present invention will be described.

Optical discs are used as media for storing a large amount of information, typically, information is recorded on and reproduced from an optical disc by an optical disc drive or a recording and reproducing apparatus. Here, configuration of optical discs and optical disc drives will be outlined.

DVD-RAM-Wo, DVD-R, DVD+R, and DVD-RAM, DVD-RW, and DVD+RW discs are recordable DVD (Digital Versatile Discs).

DVD-RAM-Wo, DVD-R, and DVD+R discs are DVD capable of recording only once, which are referred to as DVD Write Once. DVD-RAM, DVD-RW, and DVD+RW discs are DVD capable of recording more than once. As for Optical discs such as DVD+R and DVD+RW, information is recorded and reproduced by an optical disc drive as shown in FIG. 10.

Figure 10:
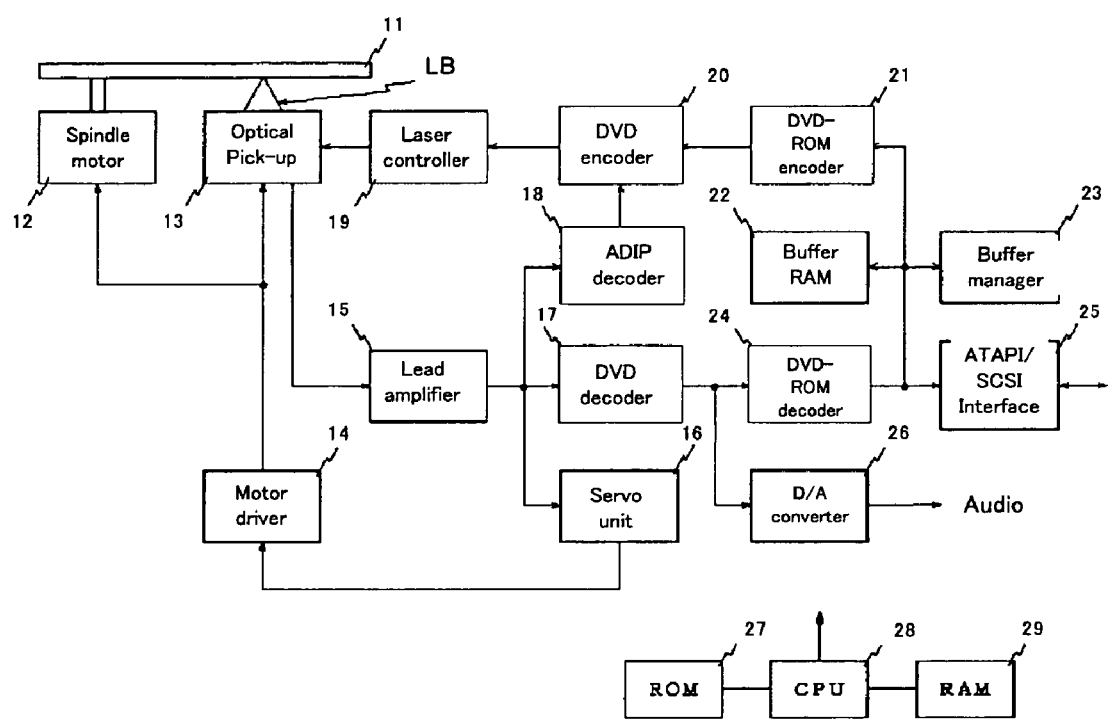
FIG. 10 is a block diagram exemplarily showing a configuration of essential parts of an optical disc drive.

FIG. 10 is a block diagram exemplarily showing essential parts of an optical disc drive. The optical disc drive shown in FIG. 10 includes optical disc 11, spindle motor 12, optical pickup 13, motor driver 14, read amplifier 15, servo unit 16, DVD decoder 17, ADIP decoder 18, laser controller 19, DVD encoder 20, DVD-ROM encoder 21, buffer RAM 22, buffer manager 23, DVD-ROM decoder 24, ATAPI/SCSI interface 25, D/A converter 26, ROM 27, CPU 28, and RAM 29. In FIG. 10, LB represents a laser beam, and Audio represents audio output signals.

In FIG. 10, the arrow marks indicate the main direction of data flow. In order to avoid a complicated expression in the figure, CPU 28 that controls the respective blocks in FIG. 10 is expressed by removing the connections with the respective blocks using only wide lines. In the ROM 27, a control program written in codes that can be decoded by the CPU 28 is stored. When the power source of the optical disc drive is turned on, the program is loaded on a main memory (not shown), CPU 28 controls the respective parts in accordance with the program, and stores necessary data to control into RAM 29 temporarily.

The structure and operations of the optical disc drive are as follows. The optical disc 11 is driven to rotate by the spindle motor 12. The spindle motor 12 is controlled by the motor driver 14 and the servo unit 16 so as to make constant the linear velocity or the angular velocity. The linear velocity or the angular velocity may be changed step-wise.

The optical pickup 13 contains a semiconductor laser, optical system, focus actuator, track actuator, receiving optics, and position sensor (not shown respectively), and irradiates laser beam LB onto optical disc 11. The optical pickup 13 can be moved in a sledge direction by a seek motor. These focus actuator, track actuator and seek motor are controlled by the motor driver 14 and the servo unit 16 based on the signals from the receiving optics and the position sensor so as to situate the spot of laser beam LB on the intended site of the optical disc 11.

In reading stage, reproducing signals obtained by the optical pickup 13 are amplified and binarized by the read amplifier 15, and input into the DVD decoder 17. The input and binarized data is demodulated by 8/16 at the DVD decoder 17. The recording data is bundled by every 8 bits and modulated to 8/16 modulation, and 8 bits are transformed into 16 bits in the modulation. In this case, the combined bits are assigned such that the prior numbers of "1" and "0" are equal when averaged, which is referred to as "suppression of DC component" wherein the fluctuation of slice level of DC cut regeneration signals is suppressed.

The demodulated data is processed with respect to deinterleave and error correction. Then the data is input into the DVD-ROM decoder 24, and further processed with respect to error correction so as to enhance the data reliability. The data subjected to two times error correction is stored once at the buffer RAM 22 by means of the buffer manager 23, and transferred to a host computer (not shown) at a time through the ATAPI/SCSI interface 25 in a state that is collected as sector data. In the case of music data, the data output from the DVD decoder 17 is input to the D/A converter 26 and then is taken out as audio output signals Audio of analog data.

Further, at the stage of writing, the data sent from the host computer through the ATAPI/SCSI interface 25 is stored at the buffer RAM 22 by the buffer manager 23 once. Then, the writing operation starts; before the operation, the laser spot is required to be situated at the writing initiating site. The site is determined from wobble signals which are previously recorded with slightly sinusoidal waves of tracks on the optical disc 11 in the case of DVD+RW/+R.

Further, the site is determined by land pre-pits in the case of DVD-RW/-R, by pre-pits in the case of DVD-RW/RAM-WO in place of wobble signals.

The wobble signals in DVD RW/+R discs contain address information of so-called ADIP (ADress In Pre-groove), which are taken out by the ADIP decoder 18. The synchronous signals generated by the ADIP decoder 18 are input to the DVD encoder 20, which enable to write data at correct sites on the optical disc 11. The data of the buffer RAM 22 are subjected to addition of error correction code and/or interleave by the DVD-ROM encoder 21 and/or the DVD encoder 20, then are recorded into the optical disc 11 by the use of recording waveforms in the present invention through the laser controller 19 and the optical pickup 13.

The recording and reproducing apparatus according to the fourteenth aspect of the present invention performs to record, on a dye-based recordable optical recording medium having a wobble in a guide groove formed on the substrate, each of the shortest marks by the use of one pulse beam being more highly energized than the pulse beam for each of the marks other than the shortest marks, third shortest marks or still longer marks by the use of one pulse beam of which the rear edge of pulse is energized for a given length of time and the energized pulse power is equal to the pulse power of each of the second shortest marks, and when the recorded marks are reproduced by the use of a reproducing beam, each of the backsides of the respective marks is irradiated with a cooling pulse at an controlled optical quantity of 0.1 mW or less for a given length of time to thereby perform recording and reproducing. Therefore, it is possible to realize high-quality recording at high-linear velocities.

The recording and reproducing apparatus according to the fifteenth aspect of the present invention performs to record third shortest marks or still longer marks by use of one pulse beam of which two sites of the front and rear edges of the pulse is energized for a given length of time and the energized pulse power is equal to the pulse power of each of the second shortest marks, therefore, the quality of recording at high-linear velocities can be further improved. The recording and reproducing apparatus according to the sixteenth aspect of the present invention performs to control the duration of cooling pulse irradiation at the backwards of the respective marks within the range of ⅙ to ⅝ of the shortest spaces, therefore, the quality of recording can be further improved by employing a more preferred cooling pulse range.

Further, the recording and reproducing apparatus according to the seventeenth aspect of the present invention performs to control the heating pulse width of a recording pulse to form a mark of which the just before the mark is the shortest as follows: the heating pulse width of the mark of which the just before the space is the shortest is distinguished depending on whether the mark to be recorded is the shortest or not, and the heating pulse width of the shortest mark is determined to be longer than the heating pulse width of marks other than the shortest mark; and the heating pulse width of the shortest mark is distinguished depending on whether the space just before the mark is the shortest, and the heating pulse width of the mark of which the just before the space is the shortest is determined to be shorter than the heating pulse width of the mark of which the just before the space is not the shortest. Consequently, high-quality recording, i.e. low-jitter can be achieved.

Further, the way to take address information may be that take the information from the land pre-pits or pre-pits.

Figure 11:
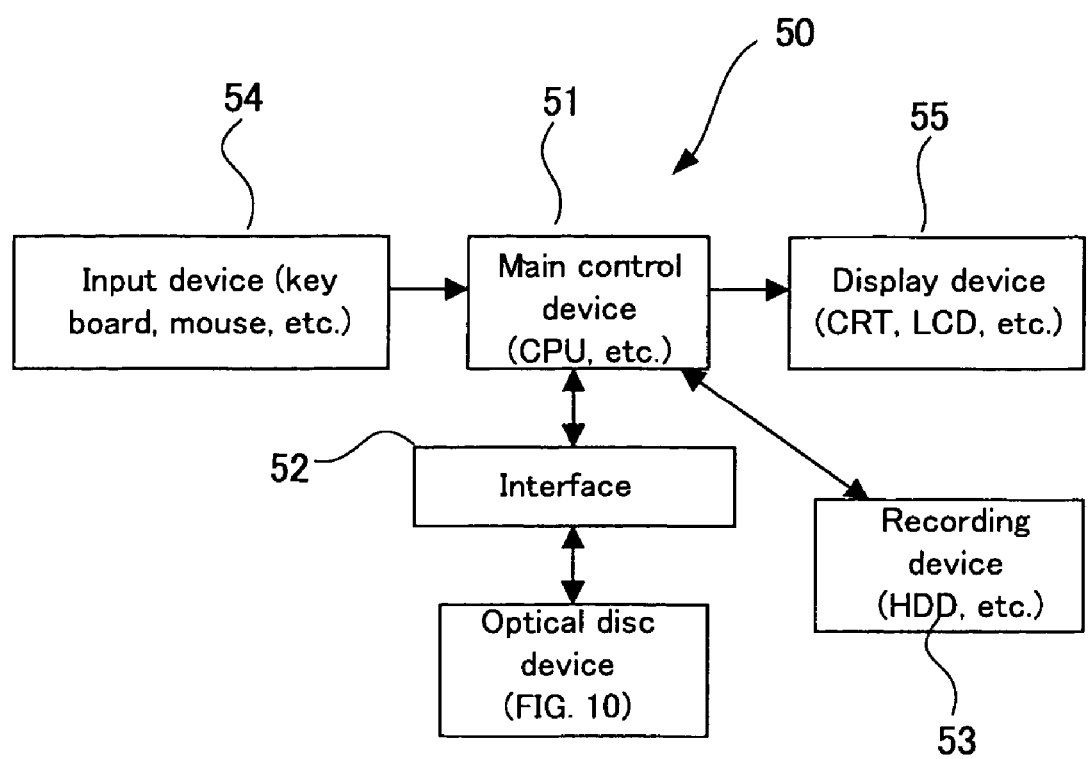
FIG. 11 is a view schematically showing an information processing unit utilizing the optical disc drive shown in FIG. 10.

FIG. 11 is a view schematically showing an information processing unit utilizing the optical disc drive shown in FIG. 10. Information processing unit 50 is equipped with main control device 51, interface 52, recording device 53, input device 54, and display device 55, and the like.

The main control device 51 is structured from a CPU (central processing unit, micro computer), main memory, and the like (respectively not shown), and controls the entire host computer thereby.

Interface 52 is a communication interface interactive with optical disc drive, and is based on standard interfaces such as ATAPI and CSI. The interface 52 is connected to interface 25 of the optical disc drive described above. The connection between the respective interfaces may be not only cable connection by means of communication line or cable such as SCSI cable but also wireless connection utilizing infrared ray for example.

Information recording device 53 (HDD, hard disc) is equipped with a program written by cords readable by the microcomputer of the main control device 51. When the driving power source of the information processing unit is turned on, the program is loaded on the main memory of the main control device 51.

The display device 55 equips a displaying part (not shown) such as a CRT, liquid crystal display (LCD), and plasma display panel (PDP), and displays various information from the control device 51. The input device 54 equips at least one input medium (not shown) such as a keyboard, mouse, and pointing device, and informs the main control device 51 of a variety of information input by users. Further, CRT equipped with a touch panel may be available as an integrated device of display 33 and input device 31. Information from the input media may be input by means of wireless connection. Further, CRT equipped with a touch panel may be available as an integrated device of the display device 55 and the input device 54. The information processing unit is equipped with an operating system (OS). All of the devices constituting the information processing unit are controlled by the operating system.

According to the present invention, information can be recorded on the dye-based recordable optical recording media with low-jitter and low-error rate at any recording linear velocities, and additional data can be effectively written with a high-frequency wobble format which can be more easily produced than land pre-pits or pre-pits used for DVD-R. In addition, recording can be performed on dye-based recordable optical recording media based on almost the same format as those of CDs-R or CDs-RW which are now produced in large quantities.

EXAMPLES

Hereafter, the present invention will be further described in detail referring to specific Examples and Comparative Examples, however, the present invention is not limited to the disclosed examples.

Examples 1 to 9 and Comparative Examples 1 to 6

A polycarbonate resin was employed as the material of the substrate; the substrate was formed by an injection molding method so as to have the following configuration: groove depth of 1,660 angstroms, half value width of 0.38 μm, track pitch of 0.74 μm, wobble frequency equal to 32T, thickness of 0.6 mm, and an outside diameter of 120 mm. Then, the following dye compound 1 and the dye compound 2 were employed in a weight ratio of 65:35 and dissolved in a solvent of 2,2,3,3-tetrafluoro-1-propanol, the solution of the dye compounds was coated on the substrate according to a spinner coating method, thereby an organic dye layer having a thickness of 900 angstroms was formed, then the organic dye layer was dried at 85° C. for 30 minutes.

Next, a reflective layer made from Ag having a thickness of 1,100 angstroms was formed on the substrate by a sputtering method, a protective layer made from acrylic photopolymer having a thickness of 5 μm was further formed on the reflective layer, and then a flat polycarbonate substrate having a thickness of 0.6 mm and an outside diameter of 120 mm prepared by an injection molding method was bonded to the protective layer using an acrylic photopolymer to thereby prepare an optical recording medium.

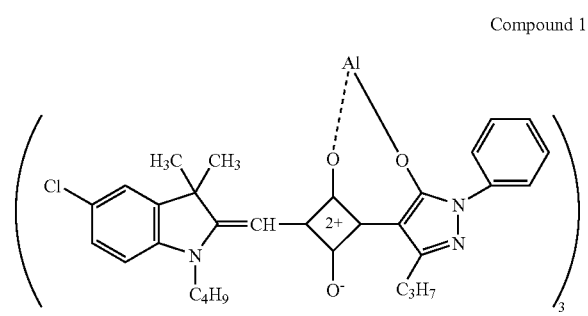

Compound 1

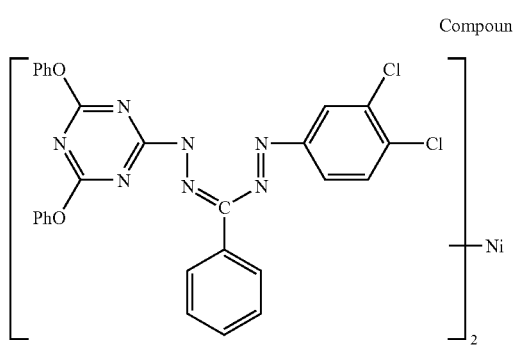

Compound 2

<Recording and Reproducing Conditions>

Recording was performed on the resulting optical recording medium by use of a semiconductor laser beam of 660 nm oscillating wavelength and 0.90 μm beam diameter. The recorded signals were EFM signals having a smallest pit length of 0.4 μm and were recorded while performing tracking under the recording conditions and the recording linear velocities shown in Table 2 with a recording power such that the bottom jitter was the minimum value, then the recorded portions were reproduced, and the jitter values, asymmetries, and PI errors were evaluated. The waveforms of the recording laser beams are as shown in FIGS. 4 to 9. In the figures, W0 is the pulse power of the shortest marks, W1 is the pulse power of the second shortest marks or the added power of the third shortest marks or still longer marks, and W2 is the pulse power of the third shortest marks or still longer marks without the added power. Further, for pulse lengths at linear velocities of 21 m/s and 28 m/s, the pulse lengths shown in FIGS. 4 to 9 are used, however, the present invention is not limited to the recording linear velocities.

In Comparative Example 1, the optical quantity of cooling portion was 0.7 mW that was the same as the reproducing beam power, namely, the waveform was the same as that of without a cooling pulse. In Comparative Example 2, the optical quantity of cooling portion was adjusted to be 0.4 mW that was greater than that of the present invention. In Comparative Example 3, as is the case with Comparative Example 1, the recording linear velocity was set at a high-linear velocity without using cooling pulse. In Example 8, the cooling pulse length was set to 0.4T that was ⅙ of the shortest space length 3T used in the present invention, namely, shorter than 0.5T.

TABLE 2

| | Recording linear velocity (m/s) | Cooling power at rear edge of pulse (mW) | Cooling pulse length (T) | W1/W2 | W0/W1 | Jitter | Asymmetry | PI Errors | Compensation in Table 1 |
|---|---|---|---|---|---|---|---|---|---|
| Ex. 1 | 21 (FIG. 8) | 0 | 1 | 1.55 | 1.05 | 7.8 | '0.00 | 6 | Compensated |
| Ex. 2 | 21 (FIG. 9) | 0 | 1.5 | 1.60 | 1.15 | 8.9 | 0.01 | 11 | Not compensated |
| Ex. 3 | 21 (FIG. 8) | 0.1 | 0.8 | 1.65 | 1.20 | 7.2 | −0.01 | 5 | Compensated |
| Ex. 4 | 28 (FIG. 6) | 0 | 2.0 | 1.80 | 1.08 | 7.4 | 0.01 | 2 | Compensated |
| Ex. 5 | 28 (FIG. 6) | 0 | 2.0 | 1.75 | 1.08 | 7.4 | 0.00 | 9 | Compensated |
| Ex. 6 | 28 (FIG. 7) | 0.1 | 2.5 | 1.90 | 1.40 | 7.0 | −0.01 | 8 | Compensated |
| Ex. 7 | 28 (FIG. 7) | 0 | 2.0 | 1.75 | 1.25 | 7.1 | −0.02 | 7 | Compensated |
| Ex. 8 | 28 (FIG. 7) | 0 | 0.4 | 1.75 | 1.05 | 7.9 | −0.04 | 18 | Compensated |
| Compara. Ex. 1 | 21 (FIG. 5) | 0.7 | 0 | 1.55 | 1.05 | 7.7 | −0.06 | 41 | Compensated |
| Compara. Ex. 2 | 21 (FIG. 8) | 0.4 | 0.5 | 1.60 | 1.05 | 7.9 | −0.04 | 35 | Compensated |
| Compara. Ex. 3 | 28 (FIG. 4) | 0.7 | 0 | 1.80 | 1.05 | 8.1 | −0.08 | 51 | Compensated |

As can be seen in Table 2, the optical recording media with recording conditions of Examples 1 to 8 showed more preferable results both in jitter and asymmetry on the whole compared to the results of Comparative Examples 1 to 3, and the results of PI errors were extremely excellent.

Recording was performed on the optical recording medium by use of a semiconductor laser beam of 660 nm oscillating wavelength and 0.90 µm beam diameter. The recorded signals were EFM signals having a smallest pit length of 0.4 µm and were recorded while performing tracking under the recording conditions and the recording linear velocity shown in Table 3 and under the condition where the compensation of the heating pulse width in Table 1 was performed, with a recording power such that the bottom jitter was the minimum value, then the recorded portions were reproduced, and the jitter values, asymmetries, and PI errors were evaluated.

In Comparative Examples 4 to 6, using a molded substrate and a test stamper in which the size of LPPb of LPP format conducted in DVD-R was changed; an optical recording medium was prepared with the similar conditions to Examples, and evaluated similarly to Examples.

TABLE 3

| | Recording linear velocity (m/s) | Cooling power at rear edge of pulse (mW) | Cooling pulse length (T) | W1/W2 | W0/W1 | Jitter | Asymmetry | PI Errors | LPPb value |
|---|---|---|---|---|---|---|---|---|---|
| Ex. 9 | 21 (FIG. 8) | 0 | 1.5 | 1.60 | 1.05 | 7.9 | 0.00 | 7 | Not set |
| Compara. Ex. 4 | 21 (FIG. 8) | 0 | 1.5 | 1.60 | 1.05 | 7.9 | 0.00 | 8 | 0.10 |
| Compara. Ex. 5 | 21 (FIG. 8) | 0 | 1.5 | 1.60 | 1.05 | 8.1 | 0.00 | 35 | 0.24 |
| Compara. Ex. 6 | 21 (FIG. 8) | 0 | 1.5 | 1.60 | 1.05 | 8.0 | 0.00 | 510 | 0.37 |

As can be seen in Table 3, the results demonstrate that larger LPPb resulted in increase of PI error even when the jitter property was proper in the samples of LPP format. Further, it was exemplified that when LPPb was less than 0.16 as shown in Comparative Example 4, the address detection was impossible in practically used apparatuses.

What is claimed is:

1. A recording and reproducing method for a dye-based recordable optical recording medium comprising:
   recording shortest marks on a recording layer by the use of one pulse which is more highly energized than pulses of each of marks other than the shortest marks,
   recording each of third shortest marks and still longer marks by the use of one pulse beam of which the rear edge is energized for a given length of time, and the energized pulse power is equal to the pulse power of each of second shortest marks, and
   irradiating cooling pulses onto the backwards of the respective pulse beams of all the marks during recording at an optical energy of 0.1mW or less for a given length of time,
   wherein the dye-based recordable optical recording medium comprises a substrate and the recording layer formed on the substrate, the substrate comprises a guide groove with a wobble formed thereon, and the recording layer comprises an organic dye as a main component.

2. The recording and reproducing method for a dye-based recordable optical recording medium according to claim 1, wherein the third shortest marks and still longer marks are recorded by the use of one pulse beam of which two sites of the front and rear edges are energized for a given length of time, and the energized pulse power is equal to the pulse power of each of the second shortest marks.

3. The recording and reproducing method for a dye-based recordable optical recording medium according to claim 1, wherein a duration to irradiate the cooling pulse onto the backwards of the respective pulse beams is ⅙ to ⅚ of a duration of the shortest space.

4. The recording and reproducing method for a dye-based recordable optical recording medium according to claim 1, wherein the heating pulse width of a recording pulse forming a mark of which the space just before the mark is the shortest is distinguished depending on whether the mark is the shortest or not, and the heating pulse width of the shortest mark is determined to be longer than the heating pulse width of marks other than the shortest mark; and the heating pulse width of a recording pulse forming the shortest mark is distinguished depending on whether the space just before the mark is the shortest or not, and the heating pulse width of the mark of which the space just before the mark is the shortest is determined to be shorter than the heating pulse width of the mark of which the space just before the mark is not the shortest.

5. The recording and reproducing method for a dye-based recordable optical recording medium according to claim 1, wherein the wobble has a frequency equivalent to 4T to 96T when a basic clock cycle is represented by "T".

6. The recording and reproducing method for a dye-based recordable optical recording medium according to claim 1, wherein a ratio between a wobble amplitude "Wo" and a push-pull signal amplitude "PP" being a difference in signals determined by means of a 2-divided photodetector for detecting track errors for controlling is determined to be in a range of $0.1 \leq Wo/PP \leq 0.4$ to perform synchronization.

7. The recording and reproducing method for a dye-based recordable optical recording medium according to claim 1, wherein the wavelength of the recording beam is 600 nm to 720 nm.

8. The recording and reproducing method for a dye-based recordable optical recording medium according to claim 1, wherein the refractive index "n" and the extinction coefficient "k" of the recording layer are in respective ranges of $1.5 \leq n \leq 3.0$ and $0.02 \leq k \leq 0.2$ with respect to light beams with a wavelength range of a wavelength of pulse beam for recording and reproducing±5 nm.

9. The recording and reproducing method for a dye-based recordable optical recording medium according to claim 1, wherein the initial decomposition temperature of the recording layer is 100° C. to 360° C.

10. The recording and reproducing method for a dye-based recordable optical recording medium according to claim 1, wherein the dye-based recordable optical recording medium is provided with at least one layer selected from a reflective layer, a protective layer, an adhesive layer, a protective substrate, and a hard-coat layer on the substrate surface, on the substrate, besides the recording layer.

11. The recording and reproducing method for a dye-based recordable optical recording medium according to claim 10, wherein the dye-based recordable optical recording medium is provided with at least the reflective layer besides the recording layer, and the reflective layer comprises any one of Au, Ag, and Al, or comprises an alloy selected from those containing any one of Au, Ag, and Al as the main component.

12. The recording and reproducing method for a dye-based recordable optical recording medium according to claim 10, wherein the dye-based recordable optical recording medium is provided with at least the protective layer besides the recording layer, and the protective layer comprises an ultraviolet curable resin.

13. The recording and reproducing method for a dye-based recordable optical recording medium according to claim 10, wherein the adhesive layer is provided between two substrates at least one of which has a guide groove with a wobble formed thereon so as to form a recording medium having two substrate surfaces, and an adhesive agent used for the adhesive layer is an ultraviolet curable resin.

14. A recording and reproducing apparatus comprising:
a shortest mark recording means configured to record shortest marks on a recording layer of a dye-based recordable optical recording medium having a wobble in a guide groove formed on a substrate by the use of one pulse which is more highly energized than pulses of each of marks other than the shortest marks,
a third mark or still longer mark recording means configured to record each of a third shortest marks and still longer marks by the use of one pulse beam of which the rear edge is energized for a given length of time, and the energized pulse power is equal to the pulse power of each of a second shortest marks, and
a cooling pulse irradiating means configured to irradiate cooling pulses onto the backwards of the respective pulse beams of all the marks during recording at an optical energy of 0.1mW or less for a given length of time,
wherein the dye-based recordable optical recording medium comprises a substrate and the recording layer formed on the substrate, the substrate comprises a guide groove with a wobble formed thereon, and the recording layer comprises an organic dye as a main component.

15. The recording and reproducing apparatus according to claim 14, wherein the third mark or still longer mark recording means is configured to record each of the third shortest marks and still longer marks by the use of one pulse beam of which two sites of the front and rear edges are energized for a given length of time, and the energized pulse power is equal to the pulse power of each of the second shortest marks.

16. The recording and reproducing apparatus according to claim 14, wherein a duration to irradiate the cooling pulse onto the backwards of the respective pulse beams is 1/6 to 6/6 of a duration of the shortest space.

17. The recording and reproducing apparatus according to claim 14, further comprising a means configured to distinguish the heating pulse width of a recording pulse forming a mark of which the space just before the mark is the shortest depending on whether the mark is the shortest or not to determine the heating pulse width of the shortest mark to be longer than the heating pulse width of marks other than the shortest mark, and to distinguish the heating pulse width of a recording pulse forming the shortest mark depending on whether the space just before the mark is the shortest or not to determine the heating pulse width of the mark of which the space just before the mark is the shortest to be shorter than the heating pulse width of the mark of which the space just before the mark is not the shortest.

* * * * *